(12) United States Patent
Smith et al.

(10) Patent No.: US 7,873,859 B2
(45) Date of Patent: Jan. 18, 2011

(54) RESTARTING FAILED IMS AUTO-RESTART BATCH APPLICATIONS

(75) Inventors: Alan R. Smith, Gilroy, CA (US); James C. Wright, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 11/969,127

(22) Filed: Jan. 3, 2008

(65) Prior Publication Data

US 2008/0104597 A1 May 1, 2008

Related U.S. Application Data

(62) Division of application No. 10/377,846, filed on Feb. 28, 2003, now Pat. No. 7,340,741.

(51) Int. Cl.
*G06F 11/00* (2006.01)

(52) U.S. Cl. .......................................... 714/2; 714/38

(58) Field of Classification Search ................. 714/2, 714/4, 5, 11, 15, 20, 37, 38; 717/124, 126, 717/127, 151; 707/1
See application file for complete search history.

(56) References Cited

U.S. PATENT DOCUMENTS

| | | | | |
|---|---|---|---|---|
| 5,201,044 A | | 4/1993 | Frey et al. .................. 395/575 |
| 5,638,508 A | * | 6/1997 | Kanai et al. .................. 714/20 |
| 5,857,204 A | | 1/1999 | Lordi et al. .................. 707/202 |
| 5,923,832 A | | 7/1999 | Shirakihara et al. ..... 395/182.13 |
| 5,953,719 A | | 9/1999 | Kleewein et al. ................ 707/8 |
| 5,983,361 A | | 11/1999 | Lee et al. ...................... 714/19 |
| 6,044,475 A | | 3/2000 | Chung et al. .................. 714/15 |
| 6,105,148 A | * | 8/2000 | Chung et al. .................. 714/16 |
| 6,122,640 A | | 9/2000 | Pereira ....................... 707/103 |
| 6,243,715 B1 | | 6/2001 | Bogantz et al. ............. 707/201 |
| 6,249,879 B1 | | 6/2001 | Walker et al. ................. 714/11 |
| 6,256,751 B1 | | 7/2001 | Meth et al. .................... 714/15 |
| 6,289,474 B1 | | 9/2001 | Beckerle ...................... 714/37 |
| 6,330,686 B1 | | 12/2001 | Denny et al. ................... 714/4 |
| 6,393,583 B1 | | 5/2002 | Meth et al. .................... 714/12 |
| 6,401,216 B1 | | 6/2002 | Meth et al. .................... 714/16 |
| 6,606,685 B2 | | 8/2003 | Huxoll ....................... 711/118 |
| 6,631,480 B2 | | 10/2003 | Zeigler et al. ................. 714/20 |
| 6,658,656 B1 | | 12/2003 | Thompson .................. 717/151 |

(Continued)

OTHER PUBLICATIONS

BMCSoftware, "Application Restart Control: General Information", Apr. 28, 2000.

(Continued)

*Primary Examiner*—Dieu-Minh Le
(74) *Attorney, Agent, or Firm*—Kunzler Needham Massey & Thorpe (57) ABSTRACT

A transfer of control to a batch application is intercepted, wherein a batch front-end routine receives control in place of the batch application and performs initialization processing. This initialization processing comprises issuing a DLI restart call and issuing a DLI checkpoint call. If the DLI restart call returns a checkpoint ID, then one or more databases associated with the batch application are repositioned. The transfer of control to the batch application is then resumed, whereby the batch application restarts from the checkpoint ID, if the checkpoint ID was returned by the DLI restart call, in a manner transparent to the batch application.

17 Claims, 10 Drawing Sheets

U.S. PATENT DOCUMENTS

| | | |
|---|---|---|
| 6,678,704 B1 | 1/2004 | Bridge et al. ............... 707/202 |
| 6,687,849 B1 | 2/2004 | Cherf ............................ 714/5 |
| 6,708,288 B1 | 3/2004 | Ziegler et al. ................. 714/15 |
| 6,874,138 B1 | 3/2005 | Ziegler et al. ............... 717/127 |
| 6,947,957 B1* | 9/2005 | Lange .............................. 1/1 |
| 7,058,849 B2 | 6/2006 | Erstad ........................... 714/5 |
| 7,353,335 B2* | 4/2008 | Kawamura .................. 711/114 |
| 2001/0042224 A1 | 11/2001 | Stanfill et al. ................. 714/16 |
| 2002/0023129 A1 | 2/2002 | Hsiao et al. .................. 709/205 |
| 2003/0135478 A1 | 7/2003 | Marshall et al. ................ 707/1 |
| 2003/0187967 A1* | 10/2003 | Walsh et al. ................. 709/223 |
| 2005/0097342 A1* | 5/2005 | Gatto et al. .................. 713/189 |

OTHER PUBLICATIONS

Tom Slater, "M/M/1 Queues", Jun. 2000, pp. 1-3, http://www.dcs.ed.ac.uk/home/jeh/Simjava/queueing/mm1_q/mm1_q.html.

* cited by examiner

```
802
804  //L    EXEC PGM=IEWL
806  //SYSLIB    DD DSN=IMSVS.SDFSRESL,DISP=SHR
808  //CKPTLIB   DD DSN=IMS.PGMLIB,DISP=SHR
810  //SYSLMOD DD DSN=IMS.PGMLIB.DISP=SHR
812  //RESLIB    DD DSN=IMS.SDFSRESL,DISP=SHR
814  //SYSPRINT DD SYSOUT=*
816  //SYSLIN    DD *
818      CHANGE PLITDLI(PLITLI),ASMTDLI(ASMTLI)
820      CHANGE CBLTDLI(CBLTLI),FORTDLI(FORTLI)
822      INCLUDE RESLIB(DFSLI000)
824      CHANGE PLITCKP(PLITDLI),ASMTCKP(ASMTDLI)
826      CHANGE CBLTCKP(CBLTDLI)
828      CHANGE FORTCKP(FORTDLI)
830      INCLUDE CKPTLIB(CKPMOD)
832      ALIAS PLITDLI
834      ALIAS ASMTDLI
836      ALIAS CBLTDLI
840      ALIAS FORTDLI
         NAME CKPLI000(R)
```

Figure 8

```
902
904  //L    EXEC PGM=IEWL
906  //SYSLIB    DD DSN=IMSVS.SDFSRESL,DISP=SHR
908  //CKPTLIB   DD DISP=SHR,DSN=IMS.PGMLIB
910  //APPLLIB   DD DSN=APPL.PGMLIB.DISP=SHR
912  //SYSLMOD DD DISP=SHR,DSN=IMSVS.PGMLIB
914  //SYSPRINT DD SYSOUT=*
916  //SYSLIN    DD *
918      INCLUDE CKPTLIB(CKPLI000)
920      CHANGE applent(USERPGM)
922      INCLUDE APPLLIB(applpgm)
924      ENTRY CKPTASM
         NAME applpgm(R)
```

RESTARTING FAILED IMS AUTO-RESTART BATCH APPLICATIONS

CROSS-REFERENCE TO RELATED APPLICATIONS

The commonly assigned patent application, entitled "AUTO-COMMIT PROCESSING IN AN IMS BATCH APPLICATION", filed on Nov. 15, 2002 by Smith et al., U.S. application Ser. No. 10/298,136, is related to this application and is incorporated by reference herein. This related patent application is hereinafter referred to as the "Auto-commit Disclosure". In addition, this application is a divisional of commonly assigned patent application, entitled "AUTO-RESTART PROCESSING IN AN IMS BATCH APPLICATION", filed on Feb. 28, 2003 by Smith et al., U.S. application Ser. No. 10/377,846, and is incorporated by reference herein.

FIELD OF INVENTION

The present invention relates generally to the automatic restart of IMS batch applications following an abnormal termination of the batch application. An IMS batch application may be either a stand-alone batch application (a batch application operating outside of an Information Management System (IMS) online environment) or a Batch Message Processing (BMP) batch application (a batch application running within an online IMS environment). IMS is a trademark of International Business Machines Corporation in the United States, other countries, or both.

More specifically, the present invention relates to a method, program product and apparatus to assist database administrators and application program developers in the implementation of needed auto-restart logic into an IMS batch application.

BACKGROUND

IMS is a hierarchical database management system (HDBMS) developed by International Business Machines Corporation. IMS has wide spread usage in many large enterprises where high transaction volume, reliability, availability and scalability are of the utmost importance. IMS provides software and interfaces for running the businesses of many of the world's large corporations. However, companies incorporating IMS databases into their business models typically make significant investments in IMS application programs in order to have IMS perform meaningful data processing work particularly tailored to the needs of their respective enterprises. IMS application programs are typically coded in COBOL, PL/I, C, PASCAL, Java or assembly language. These application programs may perform IMS database functions by making Data Language One (DLI) calls to invoke needed IMS processing.

A batch IMS application program may have been developed to run as a stand-alone batch application outside of the IMS subsystem environment. These programs are characteristically invoked by specifying either "PARM=DLI" or "PARM=DBB" on the Job Control Language (JCL) EXEC statement and are henceforth referred to as DLI/DBB batch applications.

A batch IMS application may also be developed to run as a BMP batch application executing under the control of an IMS subsystem. These programs are characteristically invoked by specifying "PARM=BMP" on the JCL EXEC statement and are henceforth referred to as BMP batch applications.

Those of ordinary skill in the art will recognize that IMS relies on the use of commit points in preserving the integrity of data managed by IMS. A commit point is defined as an indicator to IMS that a program has finished a unit of processing, and that the processing it has done is accurate. A commit point, for example, occurs when a program terminates normally, retrieves a new message from the IMS message queue or issues a checkpoint call. An eight-character checkpoint ID is generated by the application and utilized by IMS to uniquely identify each checkpoint that is taken.

IMS performs processing in association with a commit point to ascertain that, synchronous with the commit point, all data is in a known and valid state. This processing comprises hardening (i.e. making permanent) all modified data up to this point in time and ensuring that all segment locks associated with the application are released. In an online environment, all enqueue/dequeue blocks, which were used for locking segments, are released. Further, the current position in all databases (except GSAM or sequential files) is reset to the start of the database. The application program may also save any other data deemed useful to the application within a checkpoint save area. These save areas are formatted by the application program in accordance with the needs of the application program in performing a subsequent restart operation.

In view of the commit point processing briefly discussed supra, an application program has the obligation to reestablish database positioning prior to the continuation of processing following a commit point. This repositioning is performed within the application program, typically by deploying logic to issue a retrieve call to the segment reflecting current positioning prior to the commit point. This retrieve call is not automatically issued by IMS, but must be driven by the logic of the application program.

If an application program abnormally terminates before reaching the next commit point, IMS performs processing to reset the database to the state associated with the most recently completed commit point. This processing includes backing out all of the changes the application program has made to the database since the last commit point. In an online environment, this backout will be performed by IMS itself; and in a batch environment, the backout will be performed by the batch backout utility. Additionally, IMS discards any output messages written to the message queue by the application since the last commit point and releases any locks acquired by the application since the last commit point.

Accordingly, an application that is not issuing checkpoint calls or retrieving messages from the message queue will have all modifications backed out since the initial invocation of the application program. This is especially detrimental in those instances where the application program has been running for an extended period of time.

A batch IMS application, either a DLI/DBB batch application or a BMP batch application, may be initially developed without the deployment of commit point processing. This may be a reasonable development approach at the time an application is originally developed. However, various conditions and environmental factors may change over time making it desirable to add commit point processing at some future time.

For example, a database may grow in size over time such that higher processing volumes are encountered. This can result in excessive contention for record locking resources (such as enqueue/dequeue blocks in IMS), or negatively impact response time where needed segments are locked out from other online applications. Furthermore, without taking frequent commit points, an application may experience a significant recovery cost in the event of an abnormal termination. This is because all of the work performed by the application must be backed out and redone going all the way back to the beginning of the job. This may be an unacceptable impact for an enterprise that is executing long running jobs.

Furthermore, it is frequently desirable for a particular DLI/DBB batch application to be converted to a BMP batch application. For example, program recovery procedures may be greatly simplified by changing from a DLI/DBB batch application to a BMP running under the IMS subsystem. This simplification occurs because the BMP execution environment provides for advanced logging capabilities utilizing a single system log as well as automatic data backout in the case of an abnormal termination. Furthermore, the ability to share critical IMS resources is enhanced under the IMS subsystem since resources may be locked and unlocked dynamically as required, rather than locking these resources for the entire duration of the DLI/DBB batch application. However, converting and running a DLI/DBB batch application as a BMP application may encounter unwanted and unnecessary abnormal terminations when commit point processing is not being performed by the batch application. This is because, within the BMP online processing environment, enqueue/dequeue blocks must be periodically and timely released by an application to avoid exhaustion of the finite supply of these blocks, and it is commit point processing that is used to accomplish this periodic and timely release.

A novel technique for implementing commit point processing into an existing application is disclosed in the Auto-commit Disclosure, identified supra under the heading "CROSS-REFERENCE TO RELATED APPLICATIONS." A batch application program embodying the teachings contained within the Auto-commit Disclosure is hereinafter referred to as an "auto-commit batch application program."

The creation of an auto-commit batch application program may resolve numerous problems, as briefly discussed supra; however, the creation of an auto-commit batch application program also provides an opportunity to utilize automatically created checkpoint IDs to achieve an auto-restart capability within an IMS batch application. It is therefore an object of the present invention to assist the database administrator and database programmer with a novel and non-obvious solution for efficiently enhancing a batch IMS application to utilize checkpoint IDs for the purpose of automatically restarting a failed batch application.

An IMS batch application that has been transformed into an auto-commit batch application is void of any restart-related logic at the time of transformation. This is because the IMS batch application, prior to its transformation, could not have anticipated the existence of checkpoint IDs available for implementing any auto-restart logic for an application. Therefore, an auto-commit batch application program requires the addition of restart logic in order to utilize the automatically created checkpoint IDs.

Modifying an existing batch application to incorporate restart logic can be an intimidating task for even the best of programmers. This is because substantial code changes must be made with exacting precision, possibly with minimal program documentation and/or loss of contact with the original developers of the existing batch application. Furthermore, all or a portion of the source code may be missing. There may also be a concern that the source code does not match the compiled execution object code, making modification impractical due to the high risk of introducing regression problems into the application program.

IMS enterprises may delay receiving, or entirely forego, the many advantages of an auto-restart capability because of the extensive coding effort, discussed supra, involved with making the transition to an auto-restart enabled batch application. Even where the difficulty of inadequate documentation is not a factor, the complexity of implementing restart logic into an application may slow the development process, with significant increase in the coding and testing effort.

Accordingly, there is a great need for a solution to facilitate and expedite the addition of restart logic to an existing batch IMS application, as well as solutions to speed the development of new batch applications requiring automatic restart capability.

SUMMARY OF THE INVENTION

To overcome the limitations in the prior art briefly described above, the present invention provides a method, computer program product, and system to perform restart processing for a batch application. A transfer of control to the batch application is intercepted, wherein a batch front-end routine receives control in place of the batch application and performs initialization processing. This initialization processing comprises issuing a DLI restart call and issuing a DLI checkpoint call. If the DLI restart call returns a checkpoint ID, then one or more databases associated with the batch application are repositioned. The transfer of control to the batch application is then resumed, whereby the batch application restarts from the checkpoint ID, if the checkpoint ID was returned by the DLI restart call, in a manner transparent to the batch application. The above described batch front-end routine coupled to an auto-commit batch application is hereinafter referred to as an auto-restart batch application.

In another embodiment of the present invention, the above-described processing may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for restarting a failed auto-restart batch application, wherein required restart database repositioning is automatically performed without modifying the batch application, is also disclosed. The auto-restart batch application is identified on a Job Control Language (JCL) EXEC statement. A checkpoint ID associated with an automatically generated checkpoint is also specified on this JCL EXEC statement. A job comprising the JCL EXEC statement is then submitted for execution, whereby a batch front-end routine performs required database repositioning prior to the execution of the batch application in a manner transparent to the batch application.

In this manner a batch application, originally implemented without restart database repositioning processing, can be executed from an automatically generated checkpoint without having to modify the original batch application. Accordingly, the many advantages associated with checkpoint and restart processing discussed supra may be realized on a more timely schedule, with significantly less effort and greater reliability.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method for assisting database administrators and application programmers with the task of adding restart logic to an existing batch application in a manner that is transparent to the existing batch application.

The creation of an auto-commit batch application program resolves numerous problems, as briefly discussed supra. However, the creation of an auto-commit batch application program also provides an opportunity to utilize automatically created checkpoint IDs generated by the auto-commit batch application program to achieve an auto-restart capability for restarting a failed IMS batch application.

An IMS batch application that has been transformed into an auto-commit batch application is void of any restart-related logic at the time of transformation. This is because the IMS batch application, prior to its transformation, would not have anticipated the existence of checkpoint IDs available for implementing any restart logic for the batch application. Therefore, an auto-commit batch application program requires the addition of restart logic in order to utilize and benefit form the automatically created checkpoint IDs should a subsequent failure occur. An auto-commit batch application program that is enhanced to support the use of automatically generated checkpoint IDs is hereinafter referred to as an auto-restart batch application program.

Modifying an existing batch application to incorporate restart logic can be an intimidating task for even the best of programmers. This is because substantial code changes must be made with exacting precision, possibly with minimal program documentation and/or loss of contact with the original developers of the existing batch application. Furthermore, all or a portion of the source code may be missing. There may also be a concern that the source code does not match the compiled execution object code, making modification impractical due to the high risk of introducing regression problems into the application program.

IMS enterprises may delay receiving, or entirely forego, the many advantages of an auto-restart capability because of the extensive coding effort, discussed supra, involved with making the transition to an auto-restart enabled batch application. Even where the difficulty of inadequate documentation is not a factor, the complexity of implementing restart logic into an application may slow the development process, with significant increase in the coding and testing effort. The teaching of the present invention provides for incorporating restart processing into a batch application in a manner that is transparent to the batch application, thereby eliminating the tedious, error prone code modification process utilized in the prior art.

In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
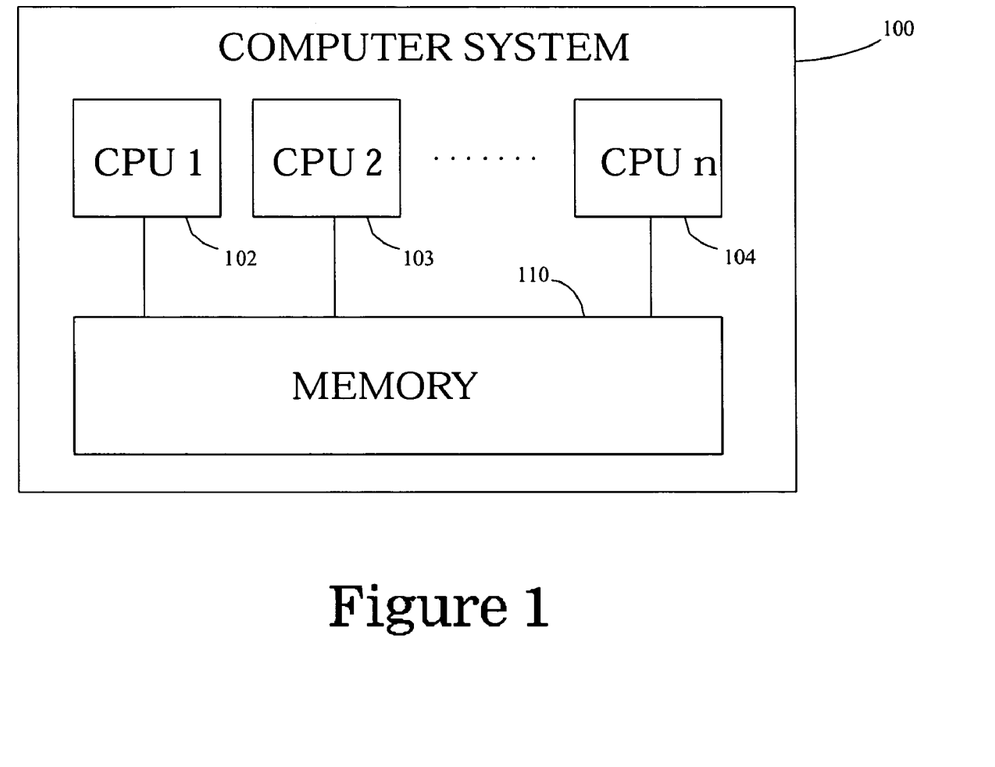
FIG. 1 is a block diagram of a typical computer system wherein the present invention may be practiced.

FIG. 1 is a block diagram of a computer system 100, such as the zSeries mainframe computer system. (zSeries is a trademark of International Business Machines Corporation in the United States, other countries, or both.) The computer system 100 comprises one or more central processing units (CPUs) 102, 103, and 104. The CPUs 102-104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, other alternative hardware computing environments may be used without departing from the scope of the present invention.

Figure 2:
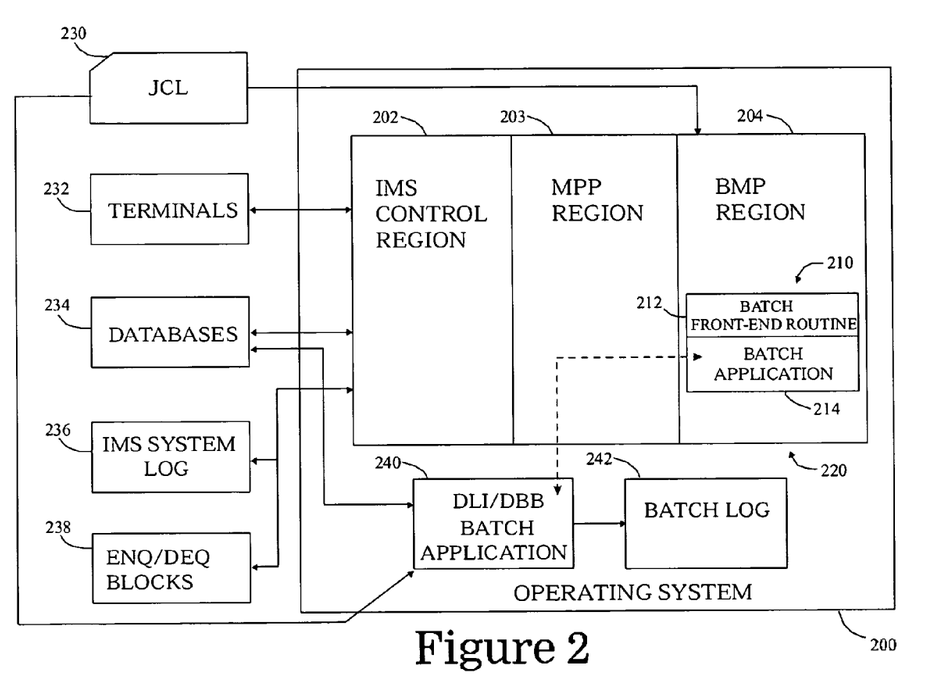
FIG. 2 is a block diagram of an exemplary IMS subsystem.

Referring now to FIG. 2, a block diagram is shown illustrating an exemplary operating system 200, such as the z/OS operating system, suitable for managing the resources of computer system 100 and providing the framework for running other computing subsystems and application programs. (z/OS is a trademark of International Business Machines Corporation in the United States, other countries, or both.) Subsystems functionally capable of being provided under the z/OS operating system include the IMS subsystem 220. The IMS subsystem 220 comprises an IMS Control region 202, which manages the region resources comprising Message Processing Program (MPP) region 203 and BMP region 204. Other resources that communicate with, or are managed by, IMS subsystem 220 comprise terminals 232, databases 234, system log 236, enqueue/dequeue blocks 238 and job control language (JCL) 230. Databases 234 may comprise several different types of IMS databases, such as DEDB, HDAM, HIDAM and HISAM.

DLI/DBB batch application 240, invoked via JCL 230, receives control from and executes under operating system 200. DLI/DBB Batch Application 240 does not use the services of IMS Subsystem 220. In this environment IMS subsystem 220 need not be present since DLI/DBB Batch Application 240 processes databases 234 directly without invoking the services of IMS Control Region 202 and utilizes a private batch log 242 in place of the IMS system log 236.

DLI/DBB batch application 240 is exemplary of a batch application that executes without the benefit of commit point processing. There are a variety of reasons why batch application 240 may be in need of modification or order to incorporate commit point processing. For example, a database processed by batch application 240 may grow in size over time such that higher processing volumes and longer execution times are encountered. In the absence of commit point processing, an enterprise may experience a significant recovery cost in the event batch application 240 abnormally terminates. This is because all of the work performed by batch application 240 must be backed out and redone going all the way back to the beginning of the batch application job. This may be an unacceptable impact for an enterprise, especially if batch application 240 is long running job.

Furthermore, it may be desirable for DLI/DBB batch application 240 to be converted to a BMP batch application. For example, program recovery procedures may be greatly simplified by changing from a DLI/DBB batch application to a BMP running under the IMS subsystem. This simplification occurs because the BMP execution environment provides for advanced logging capabilities utilizing a single system log as well as automatic data backout in the case of an abnormal termination. Furthermore, the ability to share critical IMS resources is enhanced under the IMS subsystem since resources may be locked and unlocked dynamically as required, rather than locking these resources for the entire duration of the DLI/DBB batch application.

However, converting and running a DLI/DBB batch application as a BMP application may encounter unwanted and unnecessary abnormal terminations when commit point processing is not being performed by the batch application. This is because, within the BMP online processing environment, enqueue/dequeue blocks must be periodically and timely released by the batch application to avoid exhaustion of the finite supply of these blocks, and it is commit point processing that is used to accomplish this periodic and timely release.

While a variety of reasons may exist for incorporating commit point processing into a batch application, as discussed supra, for illustrative purposes we assume that the enterprise needs to convert DLI/DBB batch application 240 to a BMP batch application, as represented by BMP batch application 214, and therefore, as discussed supra, may also find it highly desirable to incorporate commit point processing into batch application 214. Those skilled in the art will recognize that FIG. 2 is exemplary and that the teachings contained herein may also be applied to the incorporation of commit point processing into DLI/DBB batch application 240 without the further requirement to convert batch application 240 to a BMP batch application.

Batch application 214, converted from DLI/DBB batch application 240, is linked with batch front-end routine 212 to form auto-restart batch application 210. Auto-restart batch application 210 incorporates commit point processing in a manner that is transparent to batch application 214, as described in the Auto-commit Disclosure, identified supra under the heading "CROSS-REFERENCE TO RELATED APPLICATIONS." Furthermore, auto-restart batch application 210 incorporates restart logic, also in a manner that is transparent to batch application 214, to enable restart from an automatically generated checkpoint ID. Auto-restart batch application 210 executes within BMP region 204 in accordance with the present invention.

BMP batch application 210 is invoked as an auto-restart batch application via JCL 230 wherein batch front-end routine 212 first receives control and performs the novel processing described infra prior to invoking batch application 214. Those of ordinary skill in the art will recognize that FIG. 2 is exemplary in nature and that many other IMS subsystem configurations are possible within the scope of the present invention. For example, in an alternative configuration other IMS regions, such as an Interactive Fast Path (IFP) region, could also exist.

Generally, the novel methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
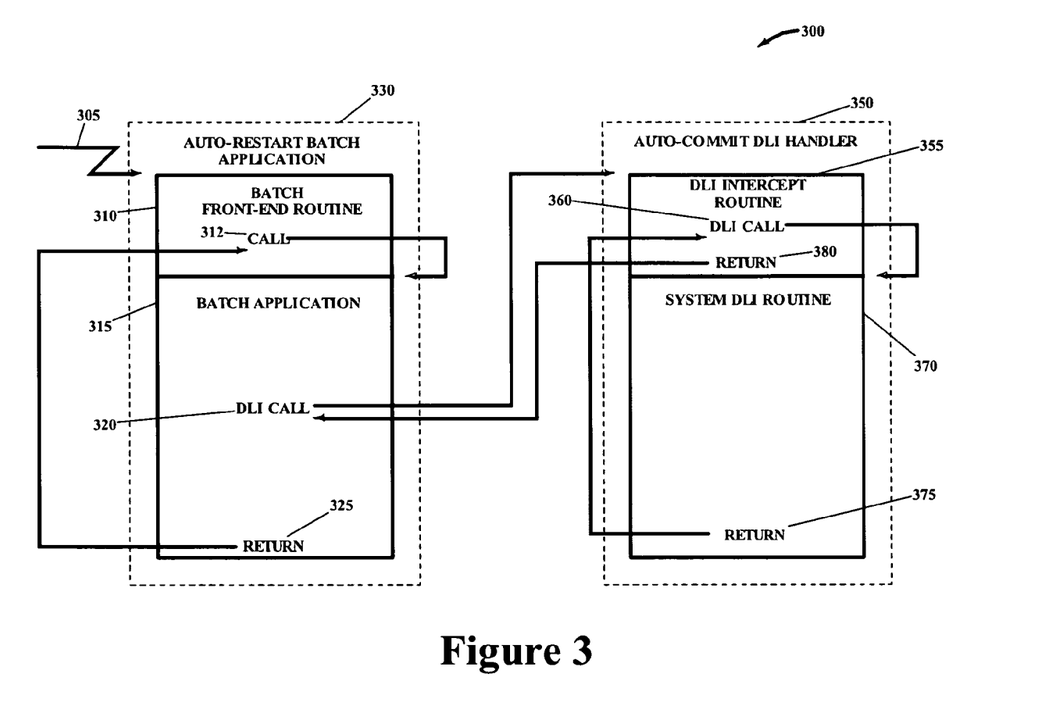
FIG. 3 is a block diagram of an auto-restart batch application and an auto-commit DLI handler.
Figure 9:
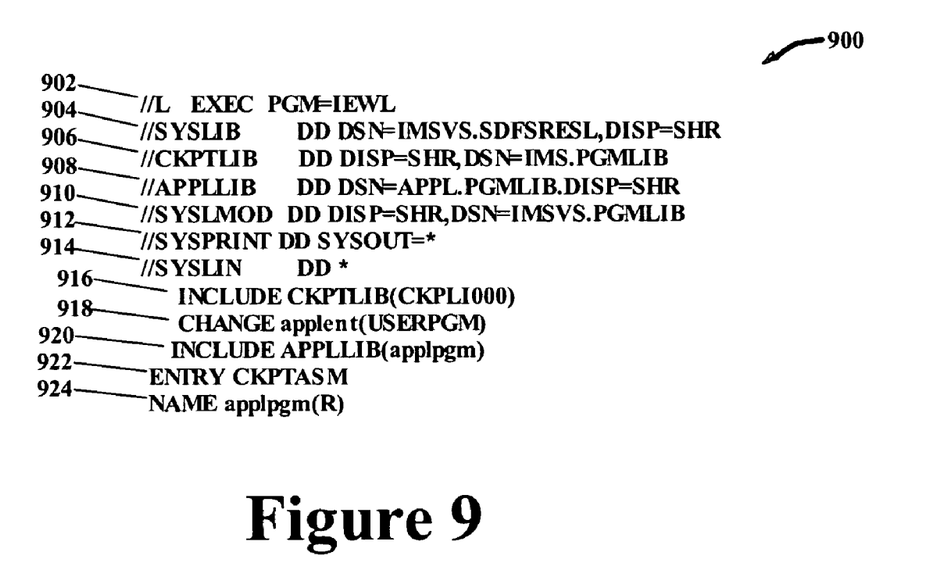
FIG. 9 shows an exemplary linkage example for an auto-commit batch application.

Referring now to FIG. 3, block diagram 300 illustrates the components and interrelationships between auto-restart batch application 330 and auto-commit DLI handler 350. Auto-restart batch application 330 comprises a load module formed by linking batch front-end routine 310 with batch application 315. This linkage, further described infra in conjunction with FIG. 9, provides for batch front-end routine 310 receiving control from the system as depicted by arrow 305 in place of batch application 315 receiving control.

Batch application 315 may be an existing BMP batch application or an existing DLI/DBB batch application. In either case, batch application 315, in an isolated state, is devoid of any commit point or restart processing logic. The teaching contained herein will show how to incorporate needed commit point and restart processing into the execution of batch application 315 in a manner that is completely transparent to batch application 315 whereby the tedious and error prone procedure of modifying the existing code for batch application 315 is eliminated.

Figure 4:
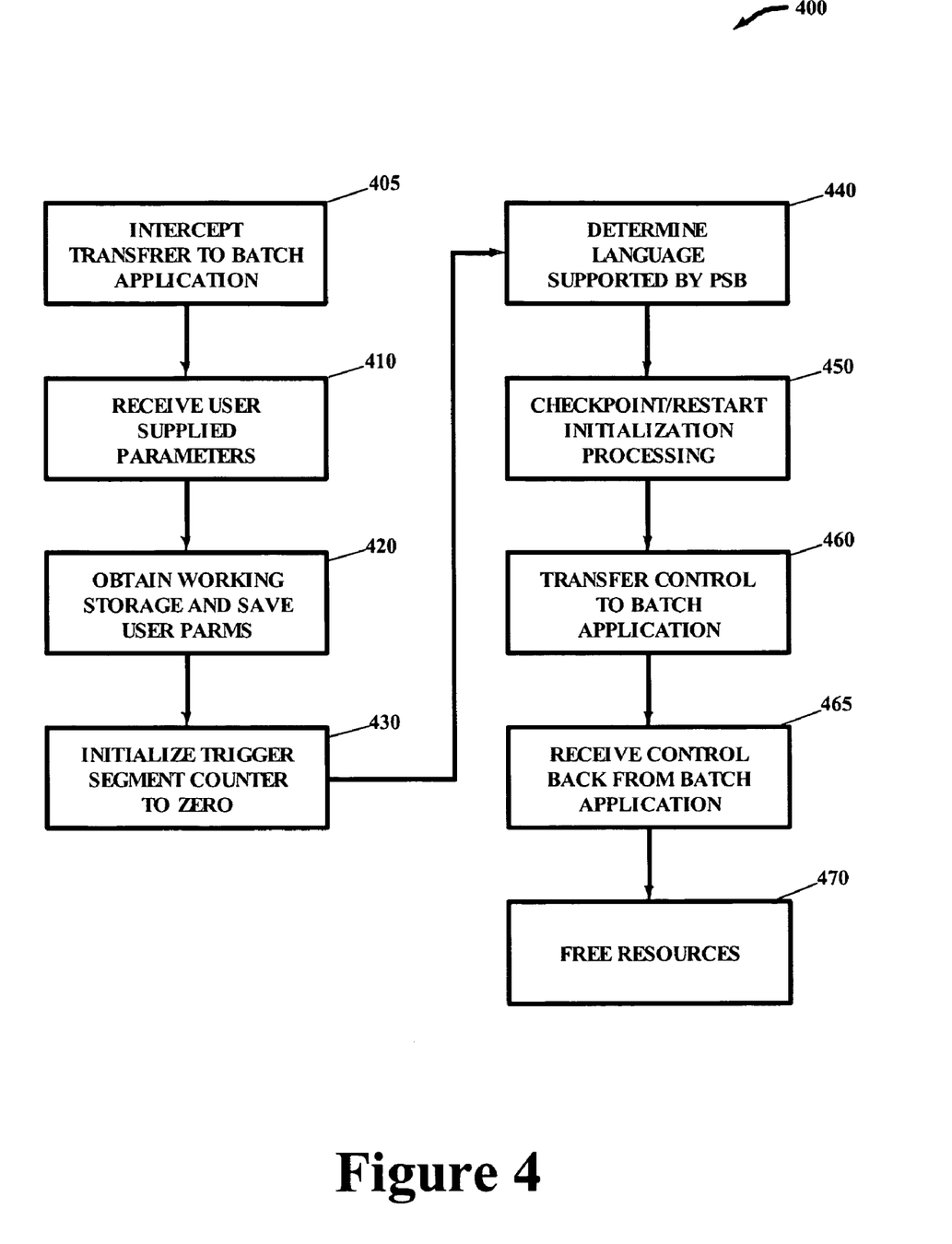
FIG. 4 is a flow diagram summarizing the initialization performed by one embodiment of the auto-restart batch front-end routine.

Batch front-end routine 310, upon receiving control, performs various initialization processes, as described in more detail infra in conjunction with FIG. 4. Then, at CALL instruction 312, control passes to batch application 315 which will execute normally without any modifications to incorporate, or have awareness of, commit point or restart processing (i.e. commit point and restart processing is completely "transparent" to batch application 315). Batch application 315 at CALL instruction 320 requests DLI processing to access a hierarchical database. Rather than transferring control to system DLI routine 370, as occurs in the prior art, DLI intercept routine 355 receives control. This is accomplished, as described in more detail infra in conjunction with FIG. 8, by linking DLI intercept routine 355 with system DLI routine 370 to form a new load module, referred to herein as auto-commit DLI handler 350.

DLI intercept routine 355 receives control from batch application 315. Then, at CALL instruction 360, control passes to system DLI routine 370. System DLI routine 370 processes the original DLI request made by batch application 315. Upon completion of IMS system DLI processing, control returns to the instruction following CALL instruction 360. Upon receiving control back from system DLI routine 370, DLI intercept routine 355 performs processing in support of auto-commit point and auto-restart enablement, as described infra in conjunction with FIG. 5. Upon completion of this enablement processing, DLI intercept routine 355 returns control to the instruction following CALL instruction 320 within batch application 315. Batch application 315 is unaware of the additional auto-commit point and auto-restart processing performed on its behalf by DLI intercept routine 355.

Batch application 315, upon completing all processing, returns to the instruction following CALL instruction 312 within batch front-end routine 310. Batch front-end routine 310 completes processing by freeing the various resources obtained during the initialization phase and then returns control to the system caller. At this point, all auto-commit point and auto-restart enablement processing has been performed transparently to batch application 315; however, all of the processing benefits that would otherwise be achieved by directly modifying batch application 315 to incorporate commit point and restart processing directly therein are still achieved.

Figure 6:
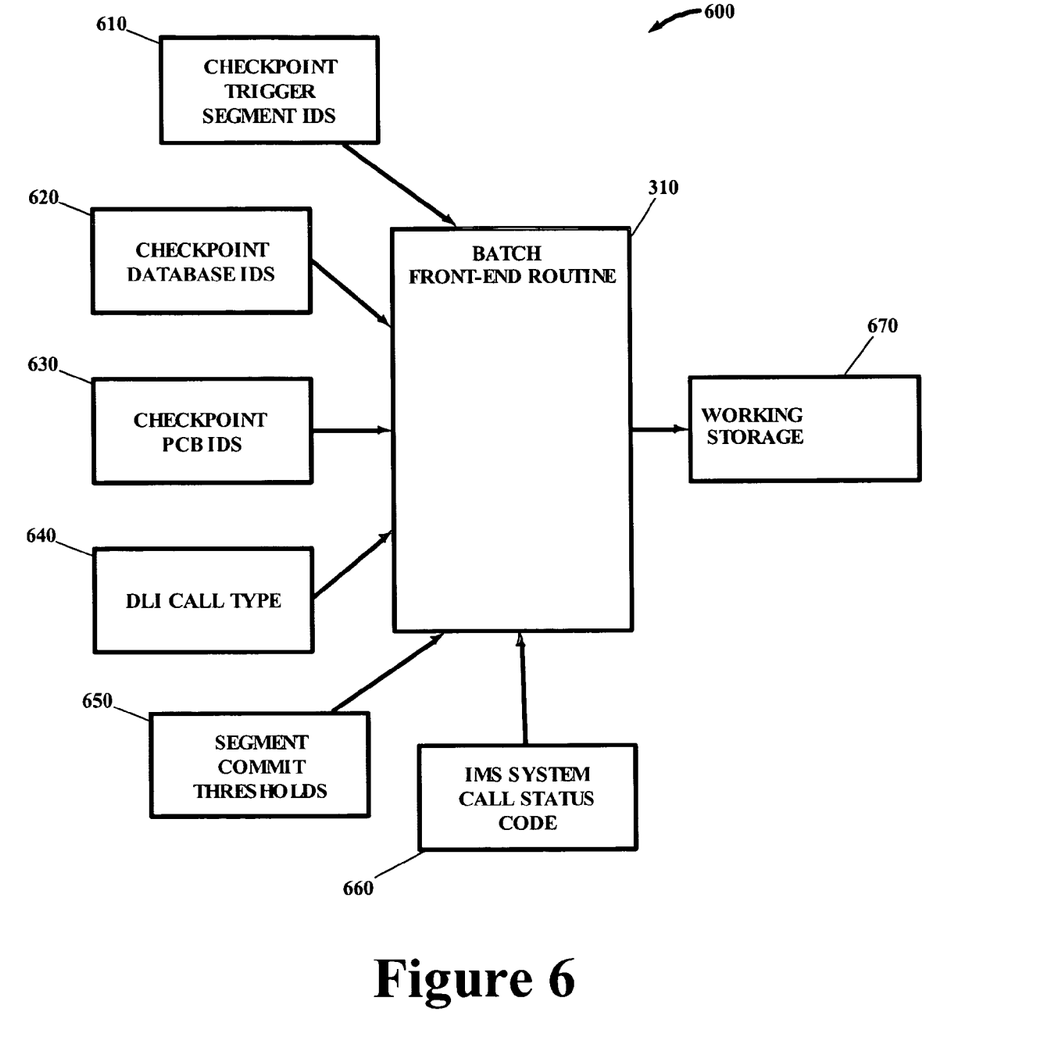
FIG. 6 shows exemplary inputs and outputs utilized by a batch front-end routine.
Figure 7:
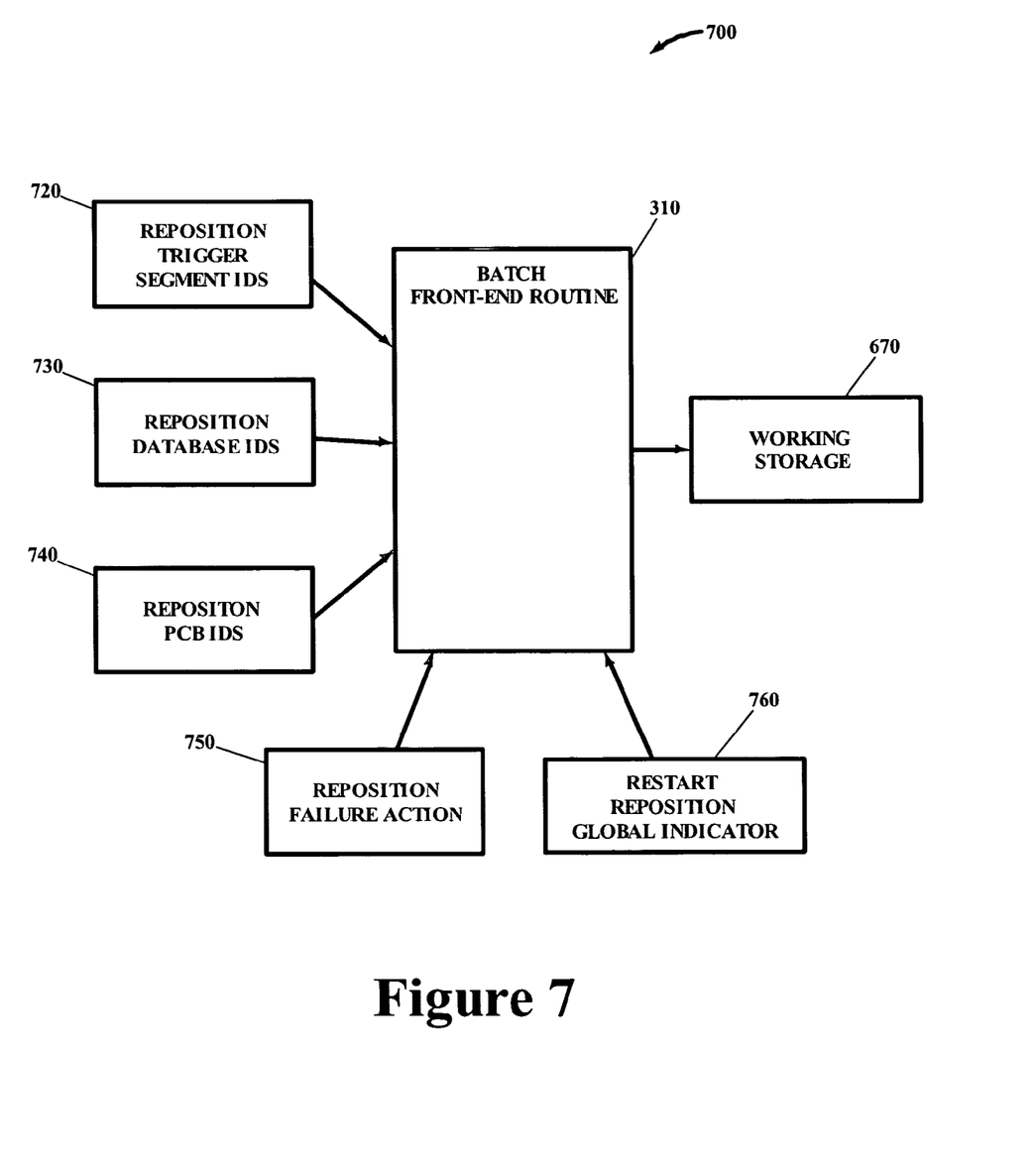
FIG. 7 shows additional exemplary inputs and outputs utilized by a batch front-end routine in support of database repositioning.

Referring now to FIG. 4, in conjunction with FIG. 6 and FIG. 7, flow diagram 400 illustrates the program flow for one embodiment of auto-restart batch application 330. In step 405, the transfer of control to batch application 315 is intercepted by batch front-end routine 310. Batch front-end routine 310, in step 410, receives user-supplied parameters. Those of ordinary skill in the art will recognize that a variety of methods may be utilized to perform the communication of user parameters to a software routine. For example, this may be accomplished by a control data set containing various parameters that are self-describing, or known by pre-determined positional information. Alternatively, user parameters could also be supplied directly via JCL 230. These, and any other parameter passing schemas known in the art now or in the future are reasonably considered to be within the scope of the present disclosure.

Next, in step 420, working storage 670 is obtained and user specified parameters are saved therein for later communication with IMS and DLI intercept routine 355. FIG. 6 and FIG. 7 illustrate exemplary user parameters to be saved in working storage 670. Segment IDs 610, database IDs 620, PCB (Program Control Block) IDs 630, DLI call type 640, segment commit threshold 650 and IMS system status code 660 returned by system DLI routine 370 comprise information referred to herein as the "checkpoint trigger" discussed in greater detail infra in conjunction with FIG. 5.

FIG. 7 illustrates additional exemplary user parameters to be saved in working storage 670 in support of database repositioning during auto-commit point and auto-restart processing. Segment IDs 720, database IDs 730, PCB IDs 740 and reposition failure action 750 comprise information referred to herein as the "reposition criteria" discussed in greater detail infra in conjunction with FIG. 5. In one embodiment, in the absence of database repositioning parameters, default processing will assume that repositioning is unconditionally required following a checkpoint in order to ensure the integrity of subsequent processing of batch application 315. Additionally, a restart reposition global indictor 760 is provided by the user to indicate whether or not repositioning is to be performed following a successful restart call by batch front-end routine 310. This provides a user the needed flexibility to override database positioning following a successful restart operation in those instances where the batch application assumes responsibility for correct database positioning independent of whether or not a restart operation is performed.

Continuing with step 430, a counter associated with each trigger segment 610, is initialized to zero. This counter is hereinafter referred to as a "trigger segment counter". A trigger segment is identified by a user as a segment that will control when commit point processing is to be performed, as described in greater detail infra in conjunction with FIG. 5. It will be appreciated by those of ordinary skill in the art that one or more trigger segments may be identified for the purpose of controlling commit point processing and that a counter will be initialized to zero for each such identified trigger segment.

In step 440, batch front-end routine 310 determines a supported language through examination of the Program Specification Block (PSB) associated with batch application 315. The PSB is generated for a particular language implementation, such as COBOL or Assembly language and thereby directs programming communications to occur in accordance with the standards of that particular language. Continuing with step 450, the initialization performed by batch front-end routine 310 includes performing initial checkpoint and restart logic, as discussed in greater detail infra in conjunction with FIG. 11. The required restart and checkpoint calls are invoked with an interface appropriate to the particular language determined in step 440, supra.

In step 460, control is transferred to batch application 315. Upon the completion of processing of batch application 315, control returns to batch front-end routine 310 at step 465 where, in step 470, all resources and working storage previously obtained during the initialization phase of batch front-end routine 310 are released.

Figure 11:
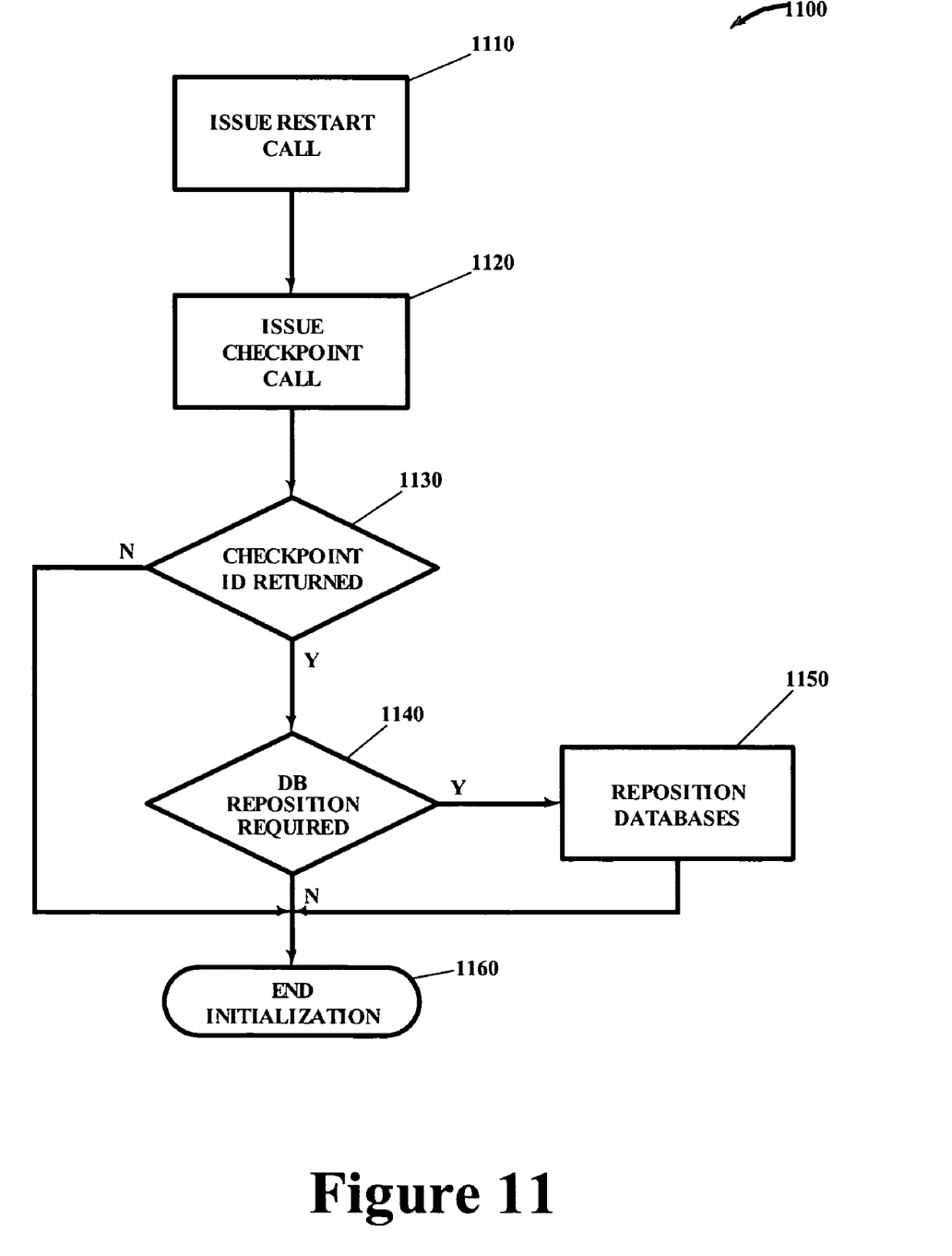
FIG. 11 is a flow diagram summarizing additional processing detail for one embodiment of an auto-restart batch front-end routine.

Referring now to FIG. 11, flow diagram 1100 illustrates additional detail for step 450 of FIG. 4. In step 1110, a DLI restart call is issued, followed by a checkpoint call in step 1120. If a checkpoint ID was specified on JCL 230 associated with batch application 315, then this checkpoint ID is returned from the restart call made in step 1110. Thus, in step 1130, a test can be made to determine if batch application 315 is restarting from a checkpoint by testing for a checkpoint ID returned from the restart call of step 1110. If not restarting from a specified checkpoint, initialization processing completes at step 1160 and processing returns to step 460 of FIG. 4. Otherwise, processing continues with step 1140 where restart reposition global indicator 760 is tested to determine if database repositioning is required.

If database repositioning not required, initialization processing completes at step 1160 and processing returns to step 460 of FIG. 4. Otherwise, in step 1150, database repositioning is performed utilizing saved key information in the checkpoint save area associated with the checkpoint ID from which this restart will occur. Following the repositioning of all databases requiring repositioning, initialization processing completes at step 1160 and processing returns to step 460 of FIG. 4.

Figure 5:
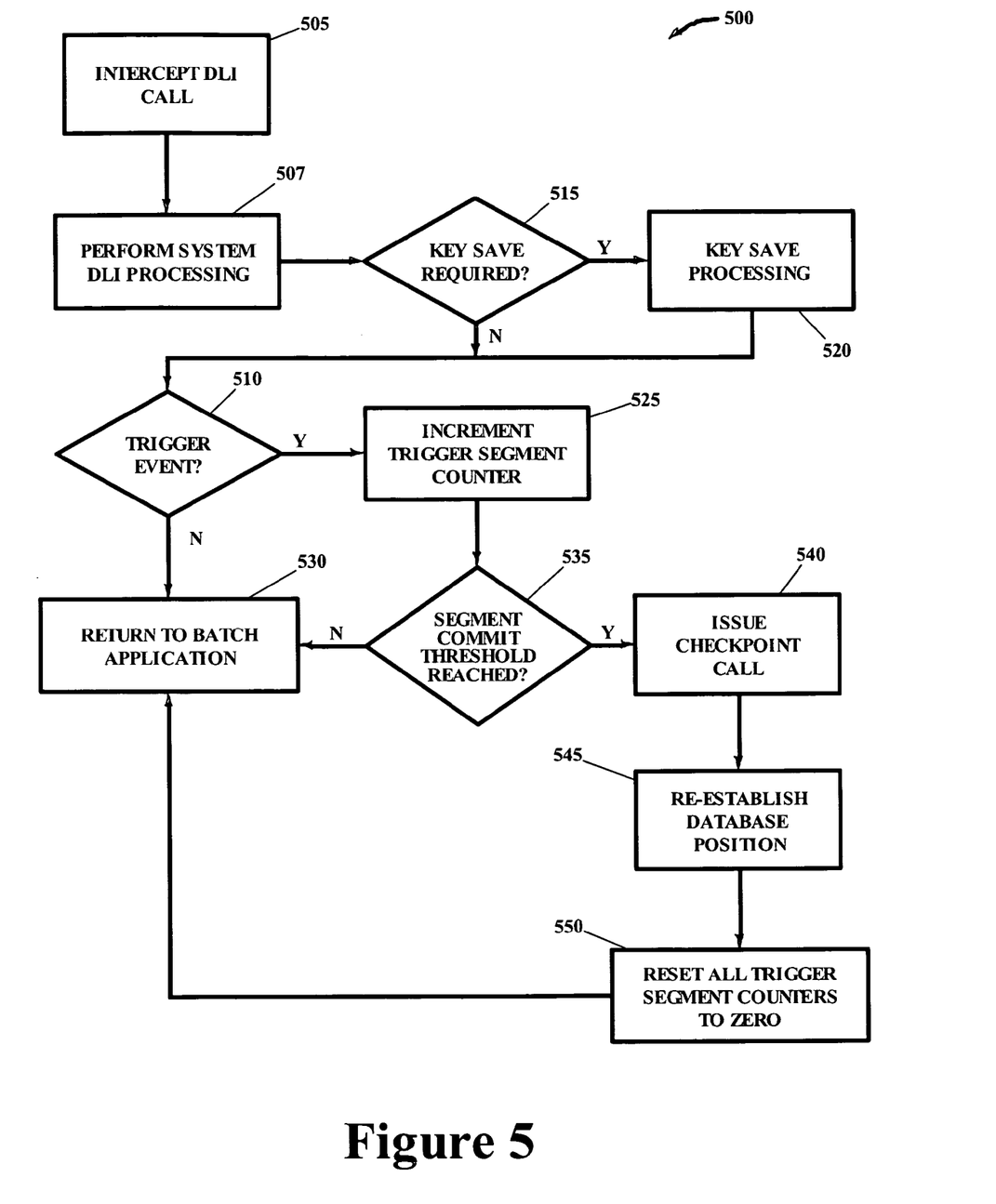
FIG. 5 is a flow diagram summarizing one embodiment of the DLI intercept routine.

Referring now to FIG. 5, flow diagram 500 illustrates the program flow for one embodiment of auto-commit DLI handler 350. In step 505, DLI intercept routine 355 receives control from batch application 315. In step 507, system DLI processing is performed by invoking system DLI routine 370. Next, in step 515 a test is made to determine if key save processing is required. Key save processing is required if repositioning criteria is specified and met. Reposition criteria comprises the identification of the database which requires repositioning, the identification of the Program Control Block (PCB) related to this database if multiple PCBs exist for this database in the PSB, and action to take if the repositioning process fails. Those of ordinary skill in the art will appreciate that the above reposition criteria elements are exemplary and that a reposition criteria utilizing different elements may be utilized.

Figure 10:
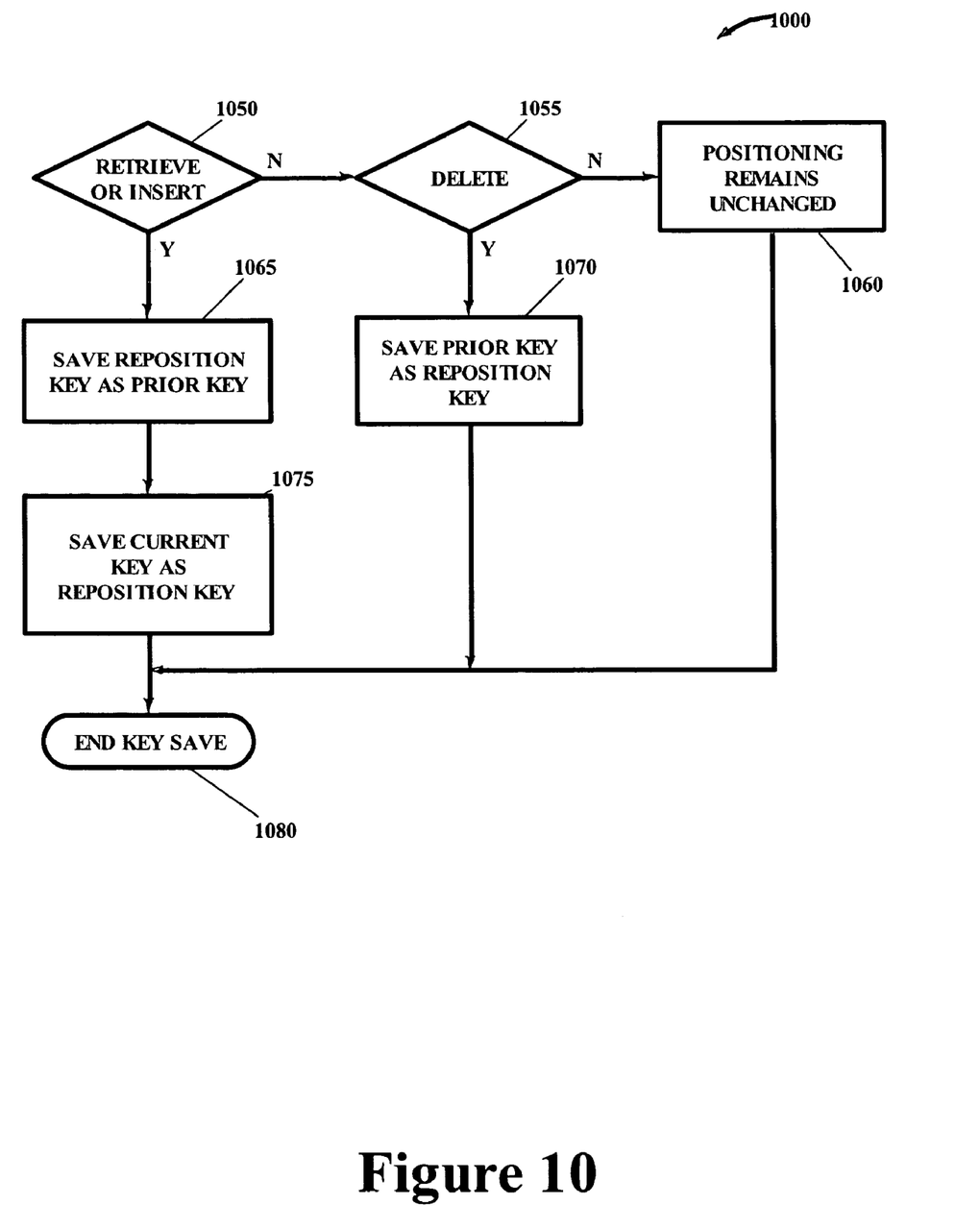
FIG. 10 is a flow diagram summarizing one embodiment of a key saving routine.

If reposition criteria has been specified and met, then in step 520 key save processing is performed prior to continuing with step 510, as discussed in more detail infra in conjunction with flow diagram 1000, FIG. 10. Otherwise processing continues directly with step 510. In an alternative embodiment, if reposition criteria is not specified, then step 520 is performed unconditionally. This may be done to ensure the integrity of subsequent processing by batch application 315 by ensuring proper database positioning even in those cases where repositioning specifications were erroneously omitted by the user. This alternative embodiment makes a trade-off in performance in order to accomplish greater ease of use and higher reliability.

Continuing now with step 510 a test is made to determine if this particular call represents a checkpoint trigger event. In one embodiment, a checkpoint trigger event occurs when a DLI call matches a checkpoint trigger. A checkpoint trigger comprises the name of the segment (or segments) whose processing drives the checkpoint process, the identification of the database to which the segment belongs, the identification of the PCB related to this database (in the case where there are multiple PCBs for this database in the PSB), a DLI call type and an IMS system call status code returned by system DLI routine 370. Those of ordinary skill in the art will appreciate that the above checkpoint trigger elements are exemplary and that a checkpoint trigger utilizing different elements may be utilized.

If it is not a trigger event, then, in step 530, control is returned to batch application 315 to continue with batch application processing. If it is a trigger event, then processing continues with step 525 wherein the trigger segment counter associated with the checkpoint trigger is incremented by one. Next, in step 535, a test is made to determine if the trigger segment counter is in a predetermined relation with the associated segment commit threshold 650. (The predetermined relation, in one exemplary embodiment, is an "equal" relation. In another exemplary embodiment, the predetermined relation is a "greater than" relation.) If the trigger segment counter is not in a predetermined relation with the associated segment commit threshold, then control passes to step 530, discussed supra. Otherwise, processing continues with step 540, where DLI intercept routine 355 issues a checkpoint call. Next, in step 545, the database position is reestablished, if required, utilizing key data recorded in process step 520, as discussed in more detail infra in conjunction with flow diagram 1000, FIG. 10. Positioning is reestablished to the original position status that existed prior to the checkpoint call of step 540. Then, in step 550, all trigger segment counters associated with the DLI call are reset to zero and processing continues with step 530, discussed supra.

Referring now to FIG. 10, flow diagram 1000 illustrates one embodiment of key save processing briefly discussed supra in the description of flow diagram 500, FIG. 5. In step 1050, a test is made to determine if the database access request is for a retrieve or an insert operation. If not, processing continues with step 1055 where a test is made to determine if the database access request is for a delete operation. If not, it is concluded in step 1060 that the current positioning for the database is valid and no further key save processing is required, wherein key save processing concludes at step 1080. Those of ordinary skill in the art will appreciate that database access operations, such as replace, do not change the current positioning of a database.

Returning now to step 1050, if the database access request is for a retrieve or insert operation, then processing continues with step 1065. Step 1065 saves the current "reposition" key as a "prior key" and then, in step 1075 the current database position key is saved as the current reposition key. It is important to note that saved keys are saved in checkpoint save areas such that they are passed to all checkpoint calls in order to associate proper database positioning with each checkpoint. On any subsequent restart from any given checkpoint these keys are made available to batch front-end routine 310 via the restart call to be utilized in performing required database positioning. Checkpoint save areas are available in the prior art and their usage is familiar to those of ordinary skill the art. Processing then concludes at step 1080, wherein key save processing is complete.

Returning now to step 1055, if the database access request is for a delete operation, then processing continues with step 1070. Step 1070 saves the prior key as the current reposition key. Those of ordinary skill in the art will recognize that when a database record is deleted the positioning of the database cannot be returned to the deleted record, which is why the prior key now reverts to the current reposition key. Those of ordinary skill in the art will further recognize that multiple PCBs may be associated with the PSB and that the aforementioned key save processing is performed on all associated PCBs. As discussed supra, saved keys are saved within checkpoint save areas. Processing then concludes at step 1080 wherein key save processing is complete.

Figure 8:
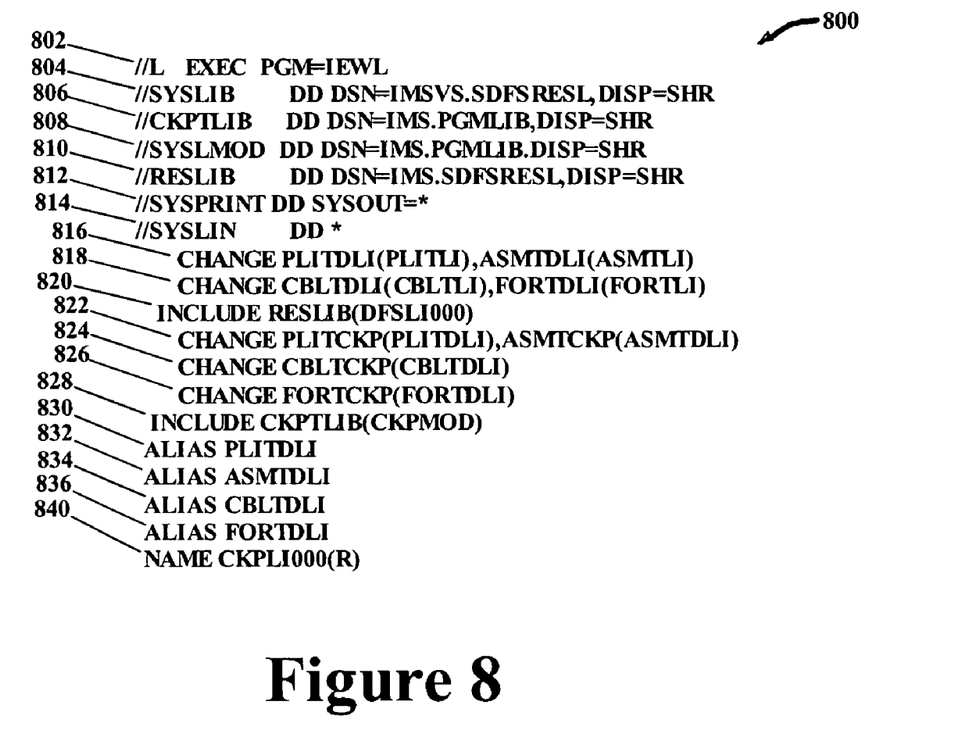
FIG. 8 shows an exemplary linkage example for an auto-commit DLI handler.

Referring now to FIG. 8, exemplary linkage editor control statements 800 are illustrated that bind together DLI intercept routine 355 with system DLI routine 370 to form auto-commit DLI handler 350. Statement 802 directs operating system 200 to transfer control to linkage editor program IEWL. SYSLIB statement 804 identifies the dataset(s) from which the binder will locate routines that are required by the bind, but have not been otherwise uniquely specified in the input to the bind. In the exemplary example, this statement identifies the data set containing the IMS system modules.

CHKPTLIB statement 806 identifies the dataset which contains DLI intercept routine 355 and SYSLMOD statement 808 identifies the dataset into which the bound DLI intercept routine 355 will be placed The RESLIB statement 810 identifies the dataset containing additional IMS system modules. The SYSPRINT statement 812 identifies destination of the summary report created during bind processing. The SYSLIN statement 814 delineates the statements that follow 816-840 as control statements to further direct the bind operation.

Statements 816 and 818 are binder CHANGE statements that rename the existing entry points in the copy of the IMS system DLI routine 370 that is bound with DLI intercept routine 355. These existing entry points will be changed from their standard system name value (such as PLITDLI) to a value (such as PLITLI), which will be used internally by DLI intercept routine 355. INCLUDE statement 820 instructs the binder to include a copy of the system DLI routine 370 from the file identified by RESLIB statement 812.

Statements 822-826 are binder CHANGE statements that rename the existing entry points in DLI intercept routine 355 to the name values that match the original standard entry point name values in system DLI routine 370. Using this technique, the entry points which would ordinarily be invoked from batch application 315 are now only available in DLI intercept routine 355, which is the only routine that has access to the original entry points in the system DLI routine 370. INCLUDE statement 828 instructs the binder to include a copy of DLI intercept routine 355 from the file identified by CKPTLIB statement 806. Statements 830 through 836 identify alias name values for the resulting auto-commit DLI handler 350 load module, designated in statement 840 as routine CHKPLI000.

Referring now to FIG. 9, exemplary linkage editor control statements are illustrated that bind together batch front-end routine 310 with batch application 315 to form auto-restart batch application 330. Statement 902 directs operating system 200 to transfer control to linkage editor program IEWL. SYSLIB statement 904 identifies the dataset(s) from which the binder will locate routines that are required by the bind, but have not been otherwise uniquely specified in the input to the bind. In the exemplary example, this statement points to the dataset containing the IMS systems modules.

CKPTLIB statement 906 identifies the dataset that contains batch front end routine 310. APPLLIB statement 908 identifies the dataset containing batch application 315 and SYSLMOD statement 910 identifies the dataset in which batch application 315 is placed. SYSPRINT statement 912 identifies the destination of the summary report created during bind processing. The SYSLIN statement 914 delineates the statements that follow 916-924 as control statements to further direct the bind operation.

Statement 916 instructs the binder to include a copy of batch front end routine 310 from the file identified by CKPTLIB statement 906. Statement 918 is a binder CHANGE statement that renames the existing entry point for batch application 315 (identified by the character string "applent") to the constant name value "USERPGM". "USERPGM" is the name value utilized by batch front-end routine 310 to transfer control to batch application 315. Statement 920 instructs the binder to include a copy of the batch application 315 from the file identified by APPLLIB statement 908.

Statement 922 instructs the binder to establish the entry point name value of the newly bound auto-commit batch application 330 as CKPTASM. Those of ordinary skill in the art will appreciate that statement 922 is an exemplary statement for an assembler application program and that other entry point name values may be utilized for other application languages. Statement 924 identifies "applpgm", the auto-commit batch application 330, as the module being created by this bind procedure. The programmer implementing the teachings contained herein must change the character string "applpgm" to the chosen name for auto-commit batch application 330.

Taken in combination flow diagram 400, 500, 1000 and 1100 in conjunction with supporting diagrams and detailed descriptions, provide for improved productivity and enhanced reliability by facilitating the incorporation of commit point and restart processing into a DLI/DBB batch application or a BMP batch application. Utilizing the teachings contained herein, commit point processing is automatically performed on behalf of a batch application in a manner that is transparent to the batch application. Further, in the event of a failure, a specified one of the automatically generated checkpoints may be utilized, in a manner transparent to the batch application, to restart the failed batch application. This transparency avoids the potential pitfalls discussed supra attendant with the modification of existing program code, as well as the development of new code. The advantages of the present teachings are especially valuable in those environments where an existing batch application is inadequately documented and/or the original creators of the software are no longer available to the enterprise for technical consultation.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. §112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for restarting a failed batch application comprising:
   intercepting, by use of a processor, a transfer of control to said batch application;
   identifying said batch application on a Job Control Language EXEC statement;
   issuing a DLI restart call;
   issuing a DLI checkpoint call;
   repositioning one or more databases associated with said batch application in a manner transparent to said batch application if said DLI restart call returns said checkpoint ID;
   resuming said transfer of control to said batch application, whereby said batch application restarts from said checkpoint ID in response to said DLI restart call returning said checkpoint ID; and
   submitting a job comprising said Job Control Language EXEC statement for execution.

2. The method of claim 1 wherein a batch front-end routine is linked with said batch application to form a auto-restart batch application.

3. The method of claim 1 wherein said repositioning of one or more databases utilizes repositioning data from a checkpoint save area returned from said DLI restart call.

4. The method of claim 1 wherein said checkpoint ID is associated with a checkpoint issued from a DLI intercept routine.

5. The method of claim 4 wherein said repositioning data is saved in said checkpoint save area by said DLI intercept routine.

6. The method of claim 1 wherein said batch application is an IMS application selected from the group consisting of a BMP batch application, a DLI batch application and a DBB batch application.

7. The method of claim 1 further comprising bypassing said repositioning of one or more databases based upon testing a restart reposition global indicator.

8. An article of manufacture for use in a computer system tangibly storing computer instructions stored on a computer readable storage device and executed by said computer system to perform a process for restarting a failed batch application, said process comprising:
   intercepting a transfer of control to said batch application;
   identifying said batch application on a Job Control Language EXEC statement;

issuing a DLI restart call;

issuing a DLI checkpoint call;

repositioning one or more databases associated with said batch application in a manner transparent to said batch application if said DLI restart call returns said checkpoint ID;

resuming said transfer of control to said batch application, whereby said batch application restarts from said checkpoint ID in response to said DLI restart call returning said checkpoint ID; and submitting a job comprising said Job Control Language EXEC statement for execution.

9. The article of manufacture of claim 8, wherein a batch front-end routine bound to said batch application is an auto-restart batch application, said auto-restart batch application configured to execute in a Batch Message Processing (BMP) region of an Information Management System (IMS) subsystem.

10. The article of manufacture of claim 9, wherein said batch front-end routine is further configured to examine a Program Specification Block (PSB) associated with said batch application to determine a supported language of said batch application.

11. The article of manufacture of claim 9, wherein said batch front-end routine is further configured to issue said DLI restart call, issue said DLI checkpoint call, and perform said required database repositioning in response to said DLI restart call returning said checkpoint ID.

12. The article of manufacture of claim 11, wherein said checkpoint ID is associated with a checkpoint issued from a DLI intercept routine.

13. The article of manufacture of claim 8, wherein said batch application is one of an IMS BMP batch application, an IMS DLI batch application, and an IMS DBB batch application.

14. A system for restarting a failed batch application, the system comprising:

a computer comprising one or more processors and memory;

an operating system comprising one or more Information Management System (IMS) subsystems, the one or more IMS subsystems further comprising an IMS control region, a Message Processing Program (MPP) region and a Batch Message Processing (BMP) region;

one or more databases;

an auto-restart batch application comprising a batch front-end routine bound to said batch application through one or more linkage editor control statements;

an auto-restart module, said auto-restart module configured to:

intercepting a transfer of control to said batch application;

identify said batch application on a Job Control Language EXEC statement;

issuing a DLI restart call;

issuing a DLI checkpoint call;

repositioning one or more databases associated with said batch application in a manner transparent to said batch application if said DLI restart call returns said checkpoint ID;

resuming said transfer of control to said batch application, whereby said batch application restarts from said checkpoint ID in response to said DLI restart call returning said checkpoint ID; and submit a job comprising said Job Control Language EXEC statement for execution.

15. The system of claim 14, wherein said repositioning of one or more databases utilizes repositioning data from a checkpoint save area returned from said DLI restart call.

16. The system of claim 14, said auto-restart batch application configured to execute in the BMP region of an IMS subsystem.

17. The system of claim 14, wherein the batch front-end routine bypasses said required database repositioning upon testing a restart reposition global indicator.

* * * * *